(12) United States Patent
Cisneros

(10) Patent No.: US 8,732,944 B2
(45) Date of Patent: May 27, 2014

(54) METHOD OF FABRICATING A STIMULATION LEAD FOR DELIVERING ELECTRICAL PULSES TO TISSUE OF A PATIENT

(75) Inventor: Homar Cisneros, Brush Prairie, WA (US)

(73) Assignee: Advanced Neuromodulation Systems, Inc., Plano, TX (US)

(*) Notice: Subject to any disclaimer, the term of this patent is extended or adjusted under 35 U.S.C. 154(b) by 454 days.

(21) Appl. No.: 13/231,274

(22) Filed: Sep. 13, 2011

(65) Prior Publication Data

US 2012/0061358 A1  Mar. 15, 2012

Related U.S. Application Data

(60) Provisional application No. 61/382,254, filed on Sep. 13, 2010.

(51) Int. Cl.
*A61N 1/05* (2006.01)
*H01R 43/00* (2006.01)
*B23K 26/20* (2014.01)

(52) U.S. Cl.
USPC .......... 29/850; 156/52; 156/281; 264/272.14; 264/272.15; 219/121.64

(58) Field of Classification Search
CPC .......... A61N 1/05; H01R 43/00; B23K 26/20

USPC .......... 29/846, 850; 156/52, 281; 264/262.14, 264/126.15; 607/116; 57/6, 17, 18; 174/113 R; 219/121.64

See application file for complete search history.

(56) References Cited

U.S. PATENT DOCUMENTS

| 7,810,233 | B2* | 10/2010 | Krulevitch et al. | 29/832 |
| 8,533,944 | B2* | 9/2013 | Swanson | 29/857 |
| 2010/0023102 | A1* | 1/2010 | Spruit | 607/116 |
| 2013/0312258 | A1* | 11/2013 | Swanson | 29/854 |

* cited by examiner

*Primary Examiner* — Samuel M Heinrich

(57) ABSTRACT

In one embodiment, a method of fabricating stimulation leads, the method comprises: providing a spool of polymer film; providing a plurality of payout carriers of wires; drawing the polymer film from the spool and the wires from the plurality of payout carriers over a rotating drum, wherein the drum comprises a plurality of grooves over an outer circumferential surface of the drum for directing the wires from the plurality of payout carriers, wherein a distance of each groove from an edge of the drum is varied about the circumference of the drum; bonding the wires to the polymer film while performing the drawing to form an intermediate assembly comprising the polymer film as a carrier with the bonded wires in a repeating pattern along a length of the intermediate assembly.

15 Claims, 10 Drawing Sheets

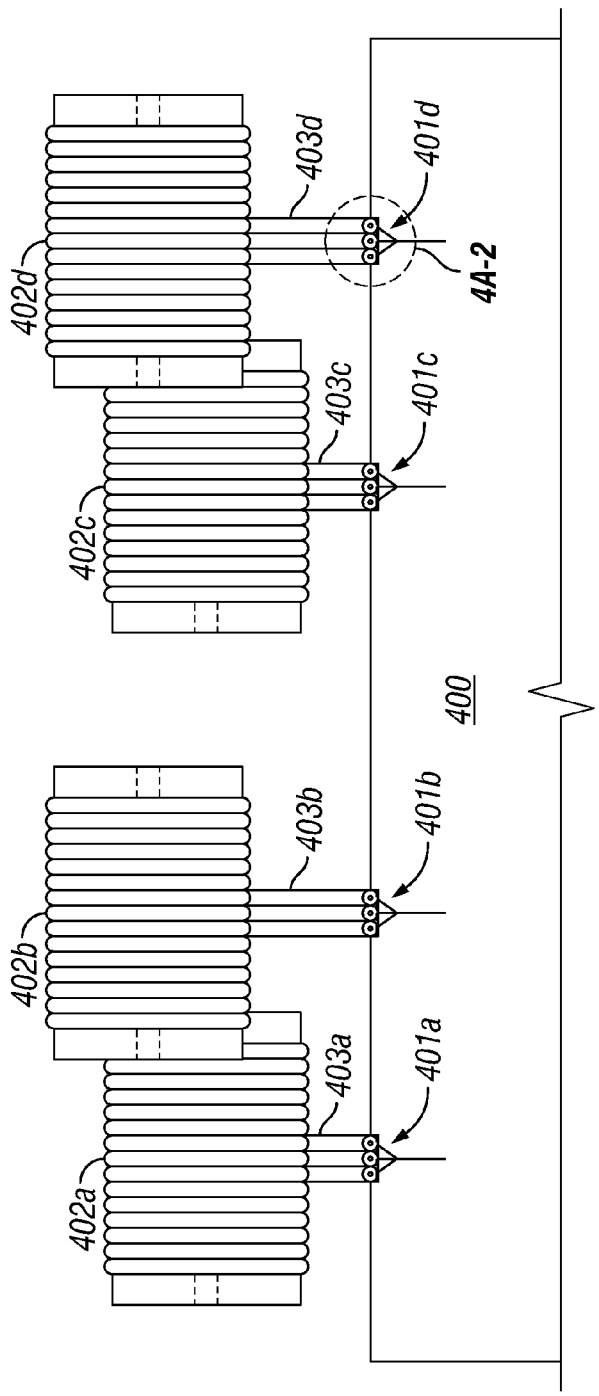
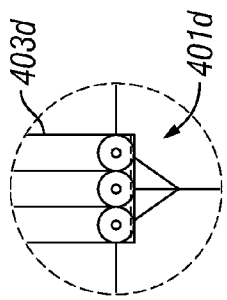
FIG. 4A-1
FIG. 4A-2

METHOD OF FABRICATING A STIMULATION LEAD FOR DELIVERING ELECTRICAL PULSES TO TISSUE OF A PATIENT

CROSS-REFERENCE TO RELATED APPLICATIONS

This application claims the benefit of U.S. Provisional Application No. 61/382,254, filed Sep. 13, 2010, which is incorporated herein by reference.

TECHNICAL FIELD

This application is generally related to a method of fabricating a stimulation lead for delivery of electrical pulses to tissue of a patient for neuromodulation.

BACKGROUND

Neurostimulation systems are devices that generate electrical pulses and deliver the pulses to nerve tissue to treat a variety of disorders. Spinal cord stimulation (SCS) is the most common type of neurostimulation. In SCS, electrical pulses are delivered to nerve tissue in the spine typically for the purpose of chronic pain control. While a precise understanding of the interaction between the applied electrical energy and the nervous tissue is not fully appreciated, it is known that application of an electrical field to spinal nervous tissue can effectively mask certain types of pain transmitted from regions of the body associated with the stimulated nerve tissue. Specifically, applying electrical energy to the spinal cord associated with regions of the body afflicted with chronic pain can induce "paresthesia" (a subjective sensation of numbness or tingling) in the afflicted bodily regions. Thereby, paresthesia can effectively mask the transmission of non-acute pain sensations to the brain.

SCS systems generally include a pulse generator and one or more leads. A stimulation lead includes a lead body of insulative material that encloses wire conductors. The distal end of the stimulation lead includes multiple electrodes that are electrically coupled to the wire conductors. The proximal end of the lead body includes multiple terminals, which are also electrically coupled to the wire conductors, that are adapted to receive electrical pulses. The distal end of a respective stimulation lead is implanted within the epidural space to deliver the electrical pulses to the appropriate nerve tissue within the spinal cord that corresponds to the dermatome(s) in which the patient experiences chronic pain. The stimulation leads are then tunneled to another location within the patient's body to be electrically connected with a pulse generator or, alternatively, to an "extension."

The pulse generator is typically implanted within a subcutaneous pocket created during the implantation procedure. In SCS, the subcutaneous pocket is typically disposed in a lower back region, although subclavicular implantations and lower abdominal implantations are commonly employed for other types of neuromodulation therapies.

The pulse generator is typically implemented using a metallic housing that encloses circuitry for generating the electrical pulses, control circuitry, communication circuitry, a rechargeable battery, etc. The pulse generating circuitry is coupled to one or more stimulation leads through electrical connections provided in a "header" of the pulse generator. Specifically, feedthrough wires typically exit the metallic housing and enter into a header structure of a moldable material. Within the header structure, the feedthrough wires are electrically coupled to annular electrical connectors. The header structure holds the annular connectors in a fixed arrangement that corresponds to the arrangement of terminals on a stimulation lead.

SUMMARY

In one embodiment, a method of fabricating stimulation leads, the method comprises: providing a spool of polymer film; providing a plurality of payout carriers of wires; drawing the polymer film from the spool and the wires from the plurality of payout carriers over a rotating drum, wherein the drum comprises a plurality of grooves over the circumference of the drum for directing the wires from the plurality of payout carriers, wherein a distance of each groove from an edge of the drum is varied about an outer circumferential surface of the drum; bonding the wires to the polymer film while performing the drawing to form an intermediate assembly comprising the polymer film as a carrier with the bonded wires in a repeating pattern along a length of the intermediate assembly; forming respective segments from the intermediate assembly; forming respective stimulation portions from the respective segments, the stimulation portions comprising electrodes electrically coupled to the wires of the segments of the intermediate assembly; and forming stimulation leads including the stimulation portions with the wires of the segments electrically coupled to wires of respective lead bodies.

The foregoing has outlined rather broadly certain features and/or technical advantages in order that the detailed description that follows may be better understood. Additional features and/or advantages will be described hereinafter which form the subject of the claims. It should be appreciated by those skilled in the art that the conception and specific embodiment disclosed may be readily utilized as a basis for modifying or designing other structures for carrying out the same purposes. It should also be realized by those skilled in the art that such equivalent constructions do not depart from the spirit and scope of the appended claims. The novel features, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the appended claims.

BRIEF DESCRIPTION OF THE DRAWINGS

FIG. 4A depicts micro-wires being applied to grooves of a rotating drum according to one representative embodiment.

DETAILED DESCRIPTION

Some representative embodiments are directed to fabrication processes for creating stimulation leads for application of electrical pulses to tissue of a patient. In some embodiments, the stimulation leads are paddle leads or cuff leads as known in the art. In some embodiments, a largely automated process is employed to layout wires in a defined pattern on a polymer film to form a portion of the paddle or cuff portion of the stimulation lead.

Figure 1:
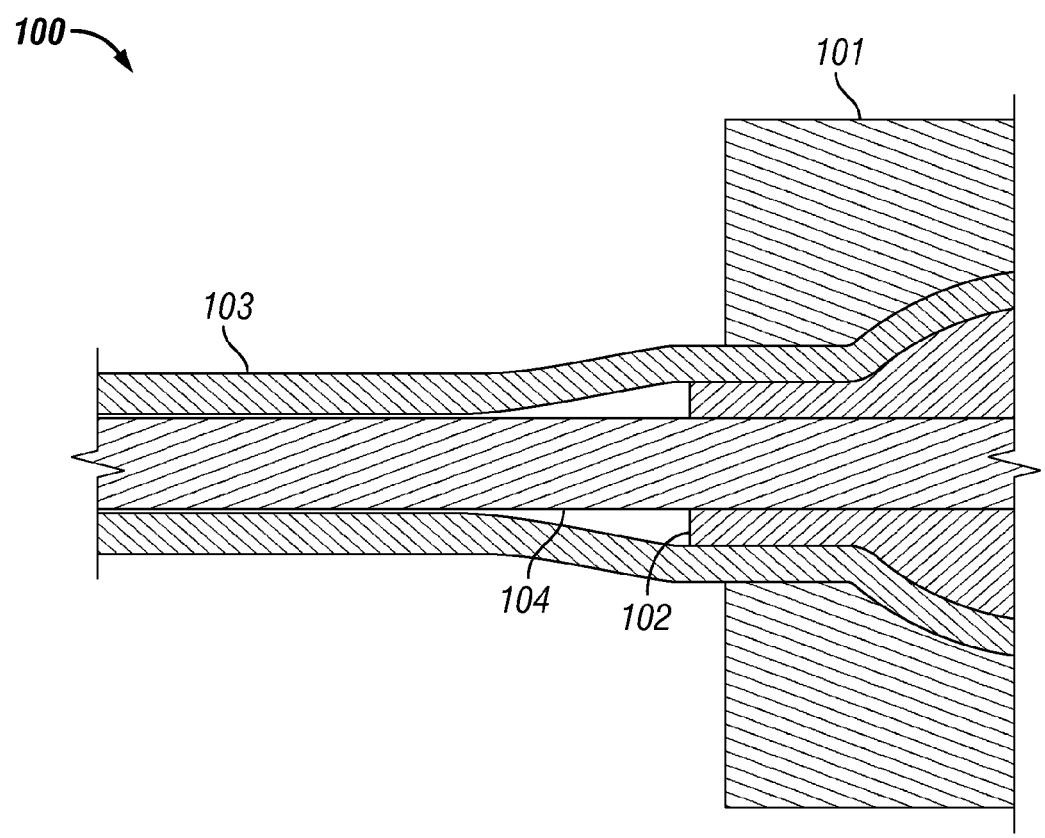
FIG. 1 depicts a distal end an extrusion device for use in a method of fabrication according to one representative embodiment.

In one embodiment, a continuous polymer film is fabricated for the purpose of receiving micro-wires of the stimulation lead during subsequent processing. The polymer film may be initially extruded using a polymer extrusion device (which are commercially available). FIG. 1 depicts a distal end of such an extrusion device 100. In operation, polymer resin material or pellets are provided to the device through a pellet hopper or similar structure (not shown) and melted within a barrel structure (not shown) of extrusion device 100. An extruder screw (not shown) may be employed to subject the polymer material to pressure to obtain and maintain the molten state of the polymer material and to transport the material through device 100 for extrusion.

As shown in FIG. 1, during the extrusion process, working material 104 is drawn through extrusion tip (sometimes referred to as die insert) 102 and taken up on a suitable spool (not shown in FIG. 1) after the extrusion. Working material 104 may be a metallic wire (e.g., of stainless steel) with a suitable outer diameter. An appropriate coating (e.g., polytetrafluoroethylene (PTFE)) may be applied to the metallic wire to facilitate subsequent separation of the extruded polymer material from working material 104. The outer diameter of working material 104 is selected to approximately correspond to the inner diameter of the cuff or the width of the paddle to be fabricated (e.g., within the range of 5 mm-15 mm). The pressure applied to the polymer material 103 within device 100 causes polymer material 103 to be forced out between extursion tip 102 and die plates 101 thereby coating working material 104.

Figure 2A:
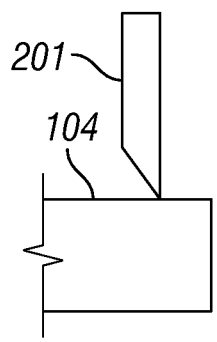
FIGS. 2A and 2B depict extruded polymer material being slit and removed from working material according to one representative embodiment.
Figure 2B:
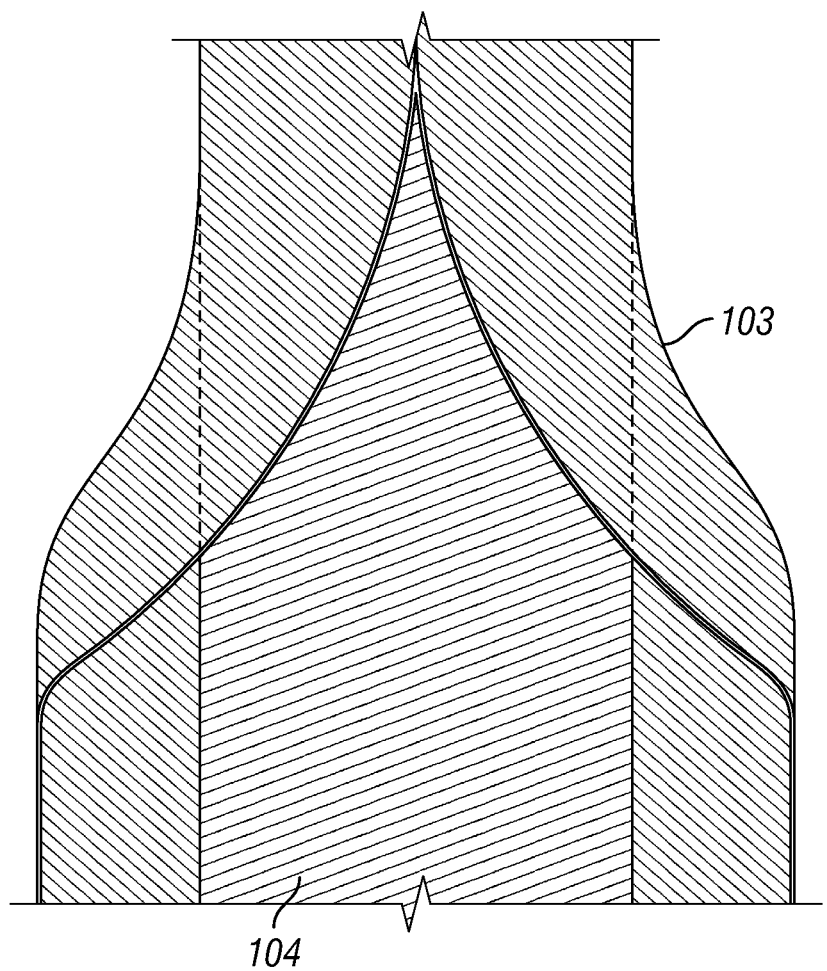
Figure 3:
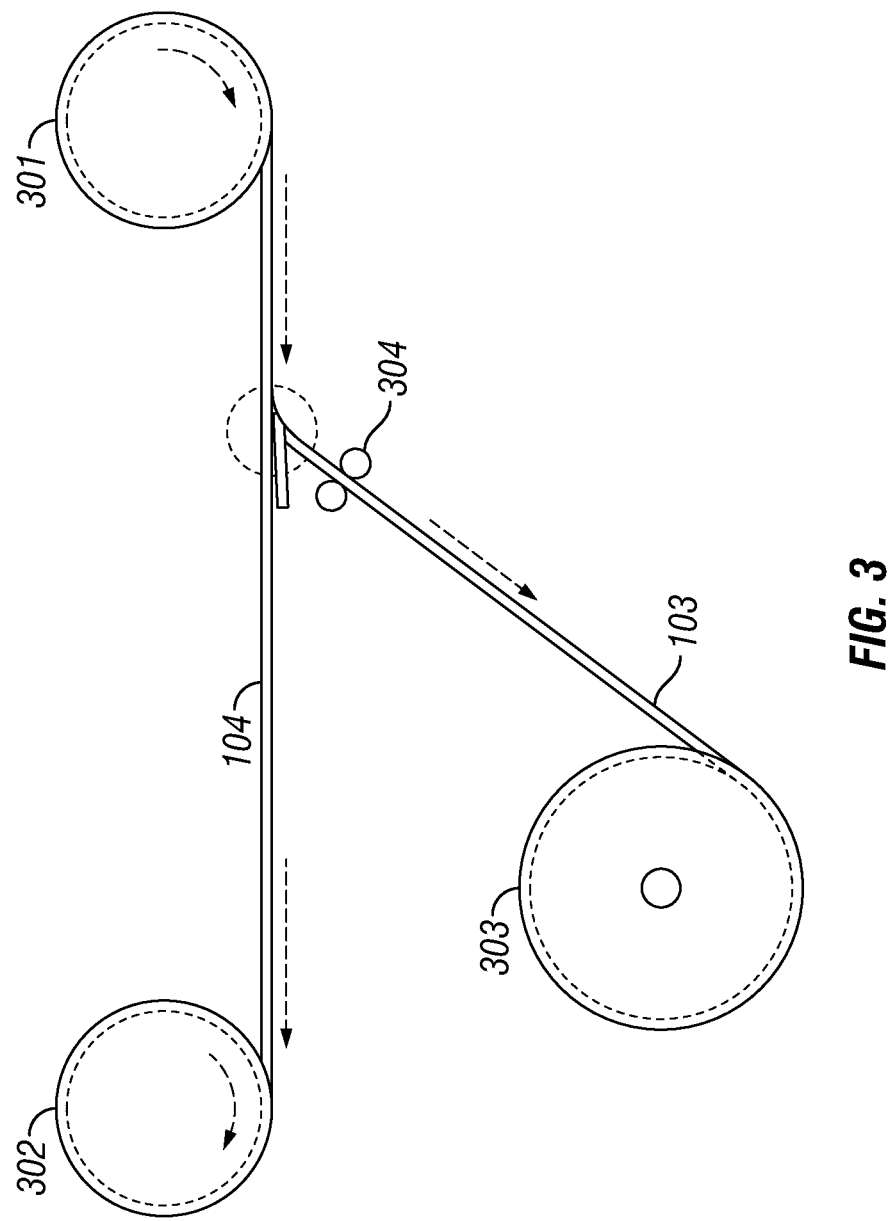
FIG. 3 a set of motorized drum rollers for collection of polymer material film according to one representative embodiment.

After extrusion of the polymer material 103 over working material 104, polymer material 103 is slit and removed from working material 104 as shown in FIGS. 2A and 2B. As shown in FIG. 2A, a suitable blade or other tool with a sharpened distal end is placed into contact with polymer material 103 over working material 104 thereby splitting polymer material 103. FIG. 2B depicts separation of polymer material 103 from working material 104. FIG. 3 depicts a set of motorized spools 301 and drum roller 303 for implementing the removal of the polymer material. As shown in FIG. 3, working material 104 with polymer material 103 is initially wound about spool 301. Working material 104 after removal of polymer material 103 is taken up by spool 302. Polymer material 103 proceeds through pinch rollers 304 and is taken up about drum roller 303.

After placement of the polymer film on drum roller 303, micro-wires are applied to the polymer film in a continuous or substantially continuous basis for eventual fabrication of multiple stimulation leads.

In some representative embodiments, micro-wires are fed into grooves of a drum structure. The drum structure is rotated thereby providing the micro-wires to the polymer film according to a pattern defined by the grooves of the drum structure. The pattern of the applied micro-wires corresponds to the design electrical paths through the cuff or paddle portion of the stimulation leads being fabricated.

FIG. 4A depicts cross-sectional view of a portion of drum 400 wherein the apex of drum 400 is shown in detail according to one representative embodiment. Grooves 401a-401d are formed on the exterior surface of drum 400 (the lateral spacing of grooves 401a-401d are exaggerated in FIG. 4A for the sake of clarity in the drawing). Payout carriers 402a-402d are also shown in FIG. 4A (any suitable number of payout carriers may be provided). Payout carriers 402a-402d comprise windings of micro-wires 403a-403d (also any suitable number of micro-wires may be employed). Payout carriers 402a-402d controllably release micro-wires 403a-403d into grooves 401a-401d during operation of the wire payout system as discussed herein. A discussion of one implementation of payout carriers that may be adapted for use according to some representative embodiments is located in U.S. Pat. No. 7,698,883, entitled "Method for producing a multielectrode lead," which is incorporated herein by reference.

While stranded bundles of stainless steel, MP35N, platinum, platinum-iridium alloy, drawn-brazed silver (DBS) or the like can be used, one embodiment of micro-wires utilizes wires formed of multi-strands of drawn-filled tubes (DFT). Each strand is formed of a low resistance material (e.g., a silver core) and is encased in a high strength material (preferably, MP35N). A selected number of strands (seven, for example) are wound and possibly coated with an insulative material (e.g., perfluoroalkoxy (PFA)). Also, multiple micro-wires 403 may be applied within an individual groove 401 (if deemed appropriate for a specific stimulation lead design) when a suitable insulative material is applied to each individual wire to maintain the electrical isolation of the respective wires.

Figure 4B:
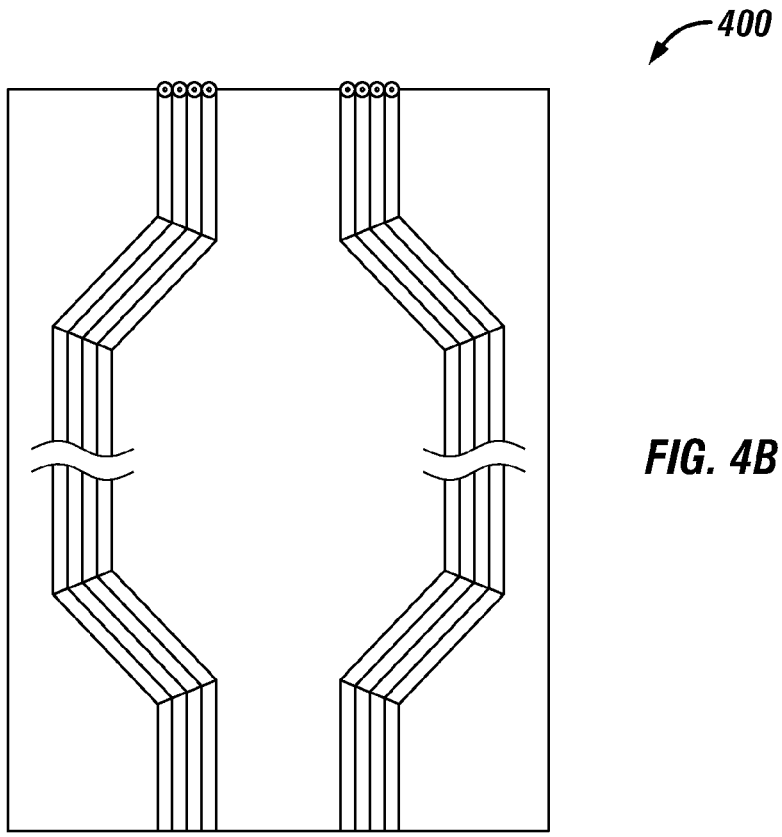
FIGS. 4B and 4C depict respective portions of the pattern of grooves on the drum shown in FIG. 4A according to one representative embodiment.
Figure 4C:
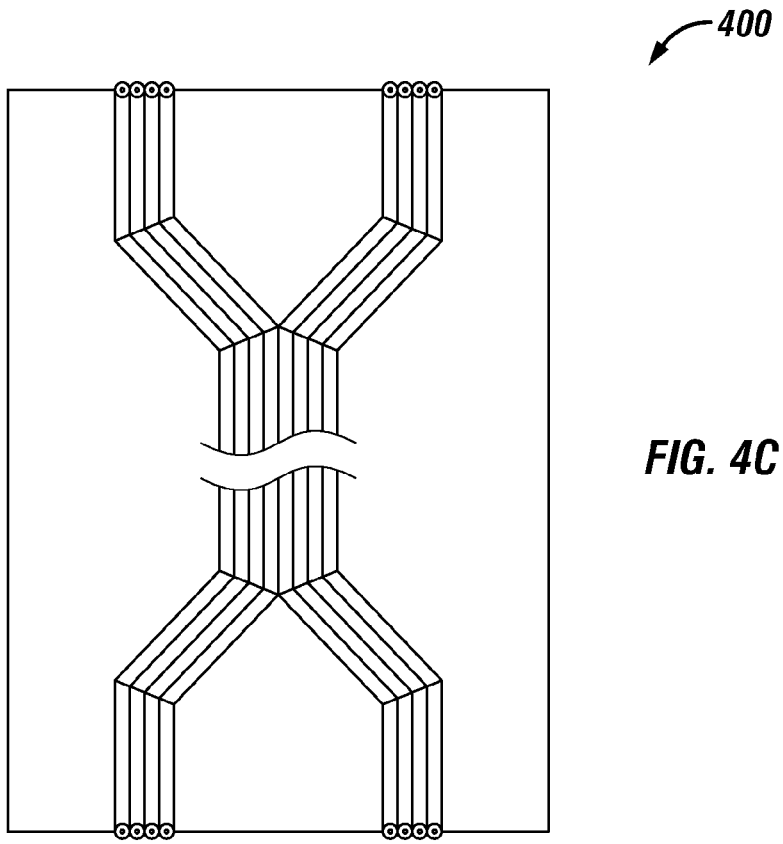

In one embodiment, the stimulation leads being fabricated will possess eight independent electrodes. Accordingly, eight micro-wires are provided to permit subsequent inclusion of the eight electrodes. FIGS. 4B and 4C depict drum 400 adapted to such an embodiment where eight grooves are included. FIGS. 4B and 4C depict views of drum 400 from opposite sides of drum 400. The lateral spacing or layout of grooves 401 is varied about the outer circumference of drum 400 to control the application of micro-wires 403 to the polymer film. The distance of each groove from its respective side or edge of drum varies about the circumference of drum 400. At respective portions, each groove has a slope directed outward and toward a respective edge of drum 400. At other portions, each groove has a slope directed inward and away from the respective edge of drum 400.

Figure 5:
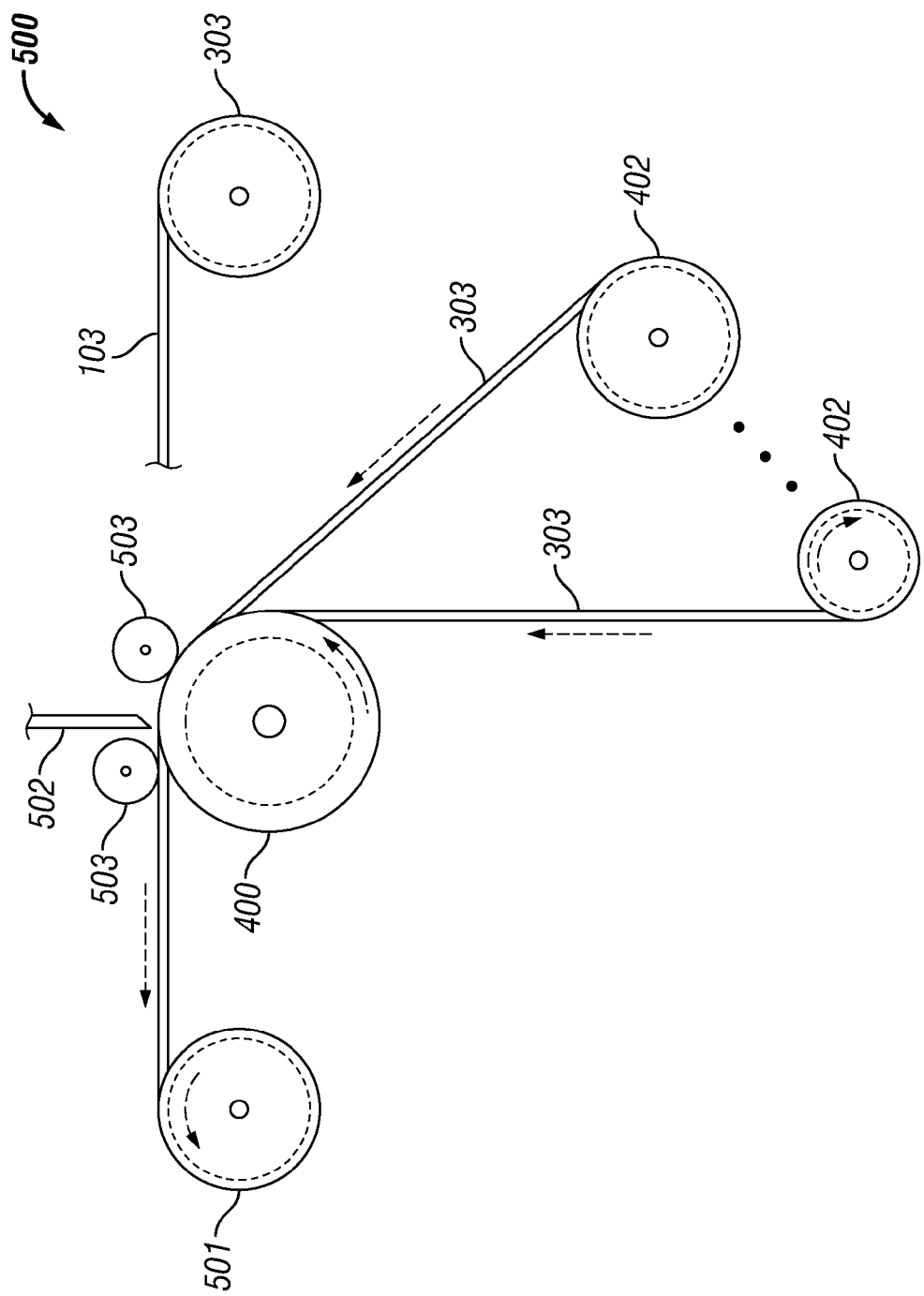
FIG. 5 depicts a system for creating polymer film material with a repeating pattern of applied micro-wires according to one representative embodiment.

FIG. 5 depicts reel-to-reel micro-wire assembly system 500 according to one representative embodiment. As shown in FIG. 5, system 500 comprises a plurality of payout carriers 402 for paying out wire to be incorporated within a cuff or paddle portions of respective stimulation leads. System 500 further comprises payout roller 303 to pay out polymer film material 103.

In operation, drum 400, payout carriers 402, payout roller 303, and collector spool 501 are driven by respective motors (not shown). Wires 303 are drawn into the grooves of drum 400 and follow the pattern of the grooves presented by rotation of drum 400. Polymer film material 103 is also drawn over the outer circumference of drum 400. Optionally, further rollers 503 may be employed to facilitate the application of the various elements to the exterior of drum 400.

As shown in FIG. 5, polymer film material 103 comes into contact with wires 303 on drum. Thermal bonding applicator 502 is employed to apply energy to heat polymer film material 103 upon coming into contact with wires 303. Upon subsequent cooling, wires 303 fuses with, adheres to, or otherwise becomes bonded to the outer surface of polymer film material 103. The polymer film material 103 then functions as a substrate or carrier for wires 303. Any suitable technology may be employed for applicator 502. Suitable examples include commercially available ultrasonic welding devices and laser systems. Alternatively, an opposing roller may apply pressure to press polymer film material 103 again the wires in the grooves on drum 400. The opposing roller may be heated to facilitate the bonding. In yet another embodiment, an adhesive or suitable chemical application may be applied to achieve the bonding of wires 303 to polymer film material 103. By bonding wires 303 to polymer film material 103 in the manner shown in FIG. 5, wires 303 will be retained on polymer film material 103 in the pattern defined by the grooves of drum 400. Polymer film material 103 with the bonded wires 303 are collected about spool 501.

In some embodiments, an additional layer of polymer film material 103 is provided to enclose wires 303 on both sides. The provision of the additional layer of polymer film material 103 need not necessarily include thermally bonding wires 303 to the additional layer of polymer film material 103.

Figure 6:
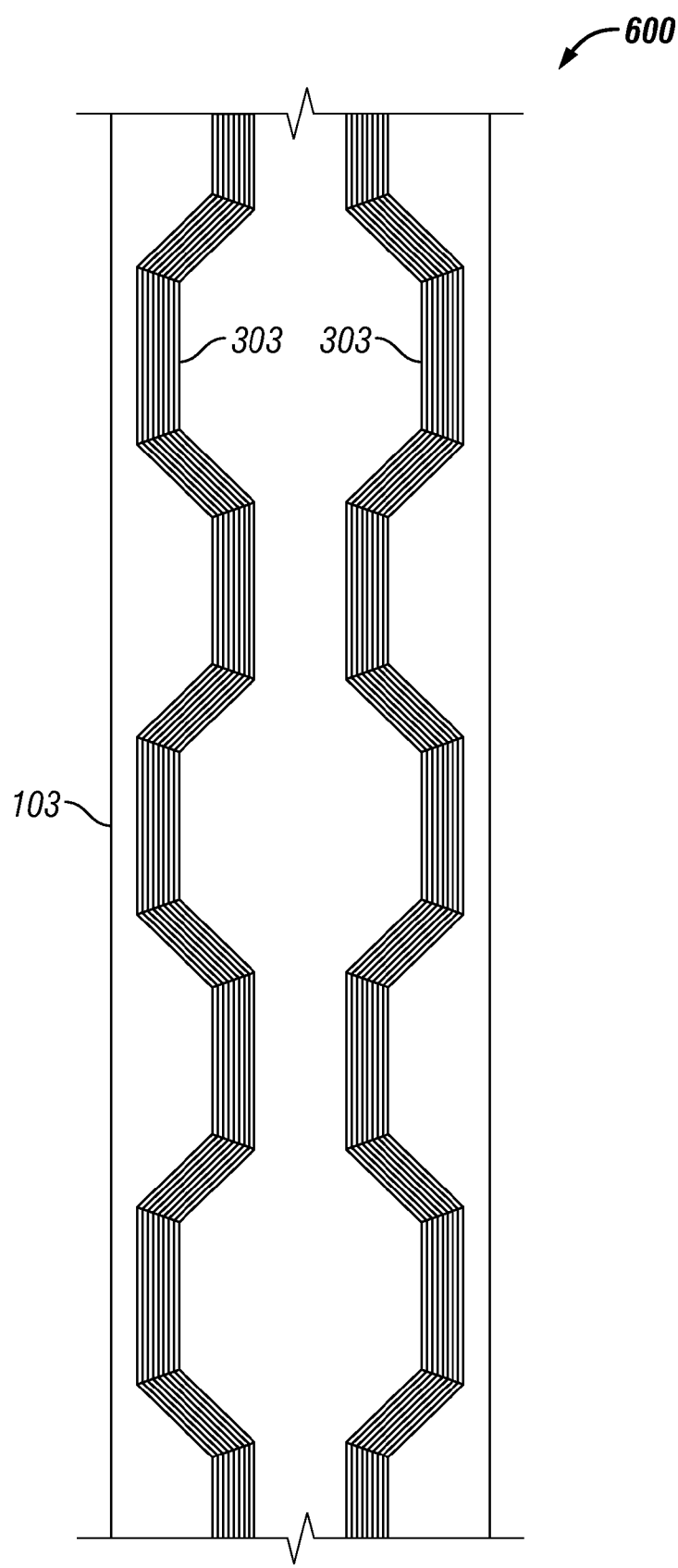
FIG. 6 depicts polymer film material with a repeating pattern of applied micro-wires according to one representative embodiment.

FIG. 6 depicts intermediate assembly 600 according to one representative embodiment. Assembly 600 is the resulting intermediate product where wires 303 are disposed in a repeating pattern along polymer film material 103. At respective portions of assembly 600, wires 303 have a slope directed outward and toward a respective edge of assembly 600. At other portions, each groove has a slope directed inward and away from the respective a respective edge of assembly 600. At still other portions, wires 303 are generally parallel to the longitudinal axis of assembly 600. The pattern in FIG. 6 is shown by way of example. Any suitable wire pattern may be employed according to other embodiments. Also, upon fabrication, intermediate assembly 600 may be adapted to possess a substantially flat profile. Alternatively, intermediate assembly 600 may be adapted to possess a curved cross-sectional profile.

Figure 7:
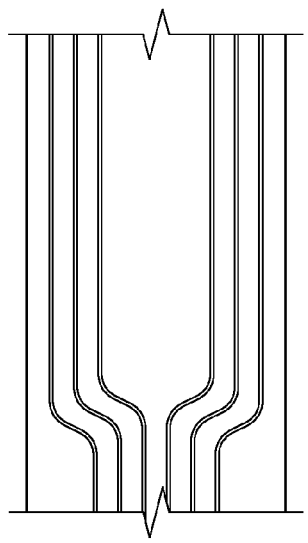
FIG. 7 depicts a cut-out segment of polymer film material according to one representative embodiment.

Assembly 600 is then processed to create individual segments of wires 303 and polymer material 103. Assembly 600 is intended to be integrated at the stimulation portion of a stimulation lead (i.e., the portion of the stimulation where the electrodes are located). A suitable laser system may be employed to cut out respective segments from assembly 600. For example, FIG. 7 depicts segment 700 intended for fabrication of a paddle-type stimulation lead. One portion of segment 700 is adapted for subsequent coupling to wires of a lead body (e.g., at a proximal end where the wires are closely spaced) as defined by the repeating pattern created by drum 400. Another portion of segment 700 is adapted for sequent coupling to electrodes as defined by the repeating pattern created by drum 400. As shown in FIG. 7, this portion disposes the wires 303 in separate groups on each side of segment 700. In the embodiment of FIG. 7, segment 700 is intended to support a paddle lead with two columns of electrodes. Any suitable number of groups may be provided depending upon the desired number of columns of electrodes.

FIG. 7 and subsequent depicts six wires 303 for the sake of clarity, although any suitable number of wires 303 may be provided. In some embodiments, the individual segments 700 are directly employed to function as the stimulation portions of respective stimulation leads. In other embodiments, substrates or support structures is provided to accompany the segments to provide the stimulation portions of respective stimulation leads.

Figure 8:
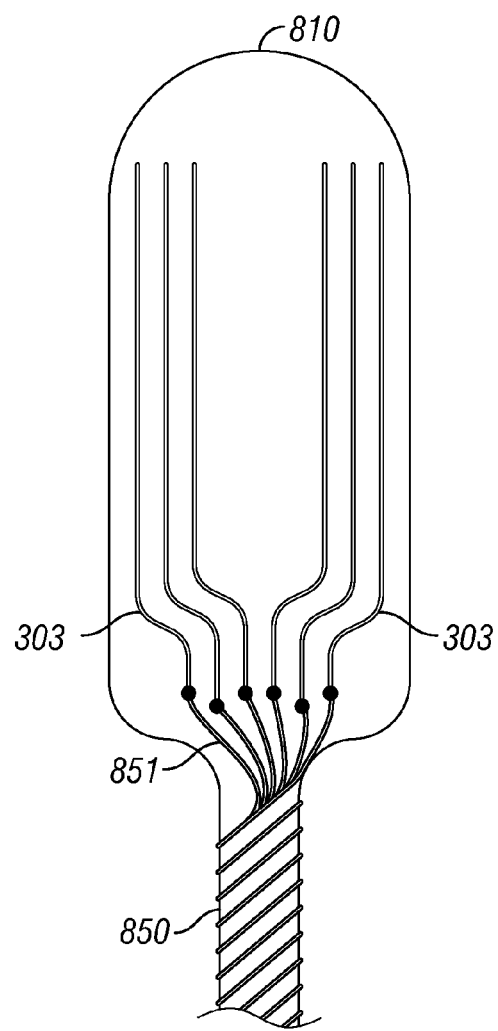
FIG. 8 depicts a paddle structure fabricated according to one representative embodiment.

In one embodiment, wires 851 of a pre-fabricated lead body 850 are electrically coupled directly or indirectly to wires 303 of a given segment of polymer film material 103 (see FIG. 8). Distal portions of wires 851 with pre-fabricated lead body 850 may be released from the insulative material of lead body 850 using suitable mechanical operations. Also, any further insulative material about wires 851 may be removed (e.g., via laser ablation) to permit direct electrical contact between wires 851 and wires 303. Any suitable welding technique may be employed to connect wires 851 with wires 303. Also, the lead body may be fabricated using any known or later developed processes. Examples of various lead body fabrication processes are disclosed in U.S. Pat. No. 6,216,045, U.S. Pat. No. 7,287,366, U.S. Patent Application Publication No. 20050027340A1, and U.S. Patent Application Publication No. 20070282411A1, which are incorporated herein by reference.

In some embodiments, paddle structure 810 (as shown in FIG. 8) is created about the given segment 702 with the attached lead body 850. For example, a suitable molding technique (e.g., injection molding) is applied to create paddle structure 810 with the various components (wires 303 and polymer film material 103) internalized within the molded polymer material. Paddle structure 810 may be substantially flat or possess a curved or other suitably varied cross-sectional profile. The over-molding process may also be employed to provide additional material at the junction between paddle structure 810 and lead body 850.

Figure 9:
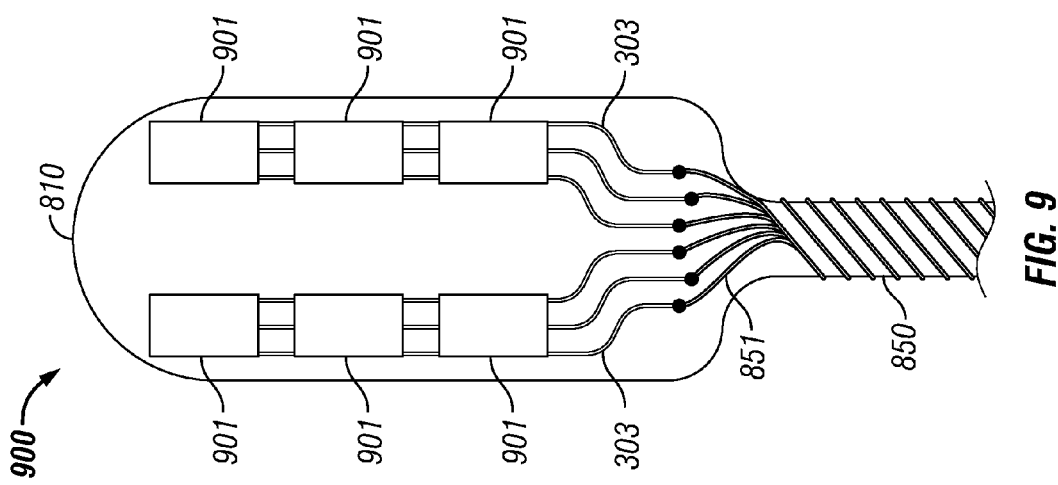
FIG. 9 depicts paddle-type stimulation lead according to one representative embodiment.

In one embodiment, electrodes 901 (see FIG. 9) are electrically coupled to wires 303 before the molding process occurs and the provided insulative material is removed to expose the upper surface of each electrode 901 after the molding is completed. In another embodiment, the mold employed for the injection molding process may define recesses (not shown) for subsequent placement of electrodes. As shown in FIG. 9, the pattern of electrodes 901 on the paddle structure 810 is preferably related to the pattern of wires 303 within paddle structure. That is, each given electrode 901 is located relative to one of the wires 303 to permit electrical coupling of the respective elements. The electrode pattern shown in FIG. 9 is by way of example only. Any suitable pattern and/or numbers of electrodes 901 may be employed according to other embodiments.

In one embodiment, a suitable laser device is employed to create a small aperture through the polymer material of paddle structure 810 and to remove the insulative material about an individual wire 303. A respective electrode 901 is then coupled to the exposed wire. A jumper wire (not shown) may be employed to facilitate the coupling. Alternatively, a portion of the individual wire 303 may be pulled up through the polymer material to directly connect to the respective electrode 901. Laser welding may be employed to weld a given wire to a respective electrode 901.

In selected embodiments, the provision of electrodes 901 is performed on an fully or semi-automated basis. Specifically, machine vision techniques may be employed to locate the appropriate locations of the electrodes 901 relative to wires 303. Also, robotic placement of electrodes 901 may occur. Also, the application of laser energy to remove polymer material and to perform welding operations may occur using machine vision techniques and suitable electronic and/or computer controls.

After electrodes 901 are provided, additional polymer material may be provided and/or the polymer material of paddle structure 810 may be heated to reflow. The reflow and/or injected polymer material may enter through gaps in electrodes 901 to secure electrodes 901 within paddle structure 810. Any polymer material covering the outer surface of electrodes 901 may then be removed. Also, other portions of the polymer material of paddle structure 810 may be suitably machined, trimmed away, or otherwise processed to obtain the appropriate intended shape of paddle structure 810.

Terminals (not shown) are provided on the proximal end of lead body 850 using any known or later developed process. Terminals are electrically coupled to electrodes 901 through the various wires or internal conductors of the lead body 850 and paddle structure 810.

Although certain tasks have been discussed in order in this application, any suitable order may be employed. Also, selected steps may be performed simultaneously. Also, selected steps may be performed in parallel. All such variations are contemplated as being within the spirit and scope of the application.

Figure 10:
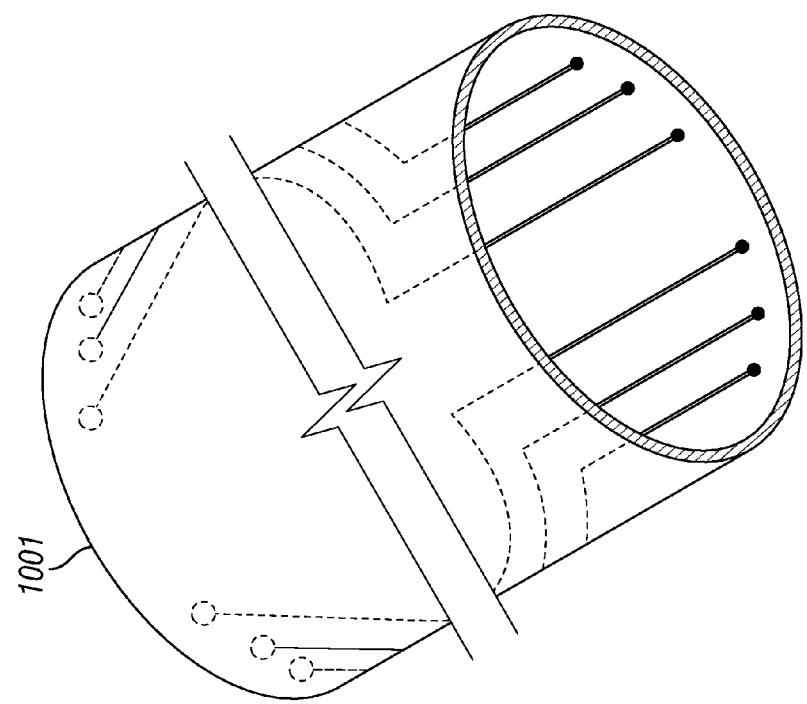
FIG. 10 depicts a segment of polymer film material adapted for fabrication of a cuff-type stimulation lead according to one representative embodiment.

Similar techniques may be employed to create a cuff-type stimulation lead. For example, FIG. 10 depicts segment 1001 intended to fabrication of a cuff-type stimulation lead. Segment 1001 is shown in a curved form where the polymer film material 103 is permitted to return to its original shaped obtained from the mandrel from the extrusion process. That is, segment 1001 is biased to assume the curved profile when placed in a relaxed state (e.g., without the application of exterior forces to cause segment 1001 to be planar). In other embodiments, segment 1001 may be disposed in a planar form in selected processing steps and subsequently provided with a curved cross-sectional shape upon final disposition in the cuff structure of the stimulation lead.

In lieu of a paddle structure, molding or other suitable technique may be employed to provide a thicker substrate for the cuff structure (if deem appropriate) having the desired cuff-shape. The material characteristics of the substrate (e.g., durometer) may be selected according to accommodate placement of the cuff about a peripheral nerve. Suitable electrodes may be provided at appropriate locations relative to segment 1001. Also, wires of a lead body are preferably coupled to respective wires of segment 1001 to form the stimulation lead.

Figure 11:
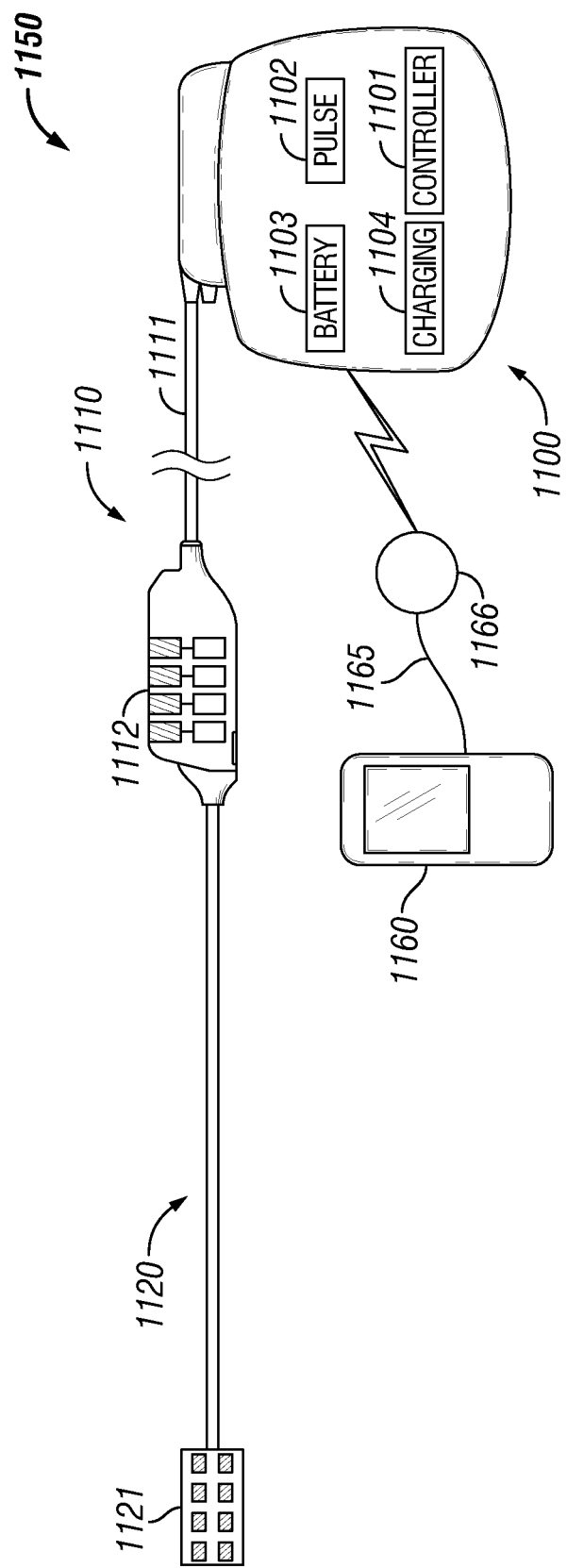
FIG. 11 depicts a neurostimulation system according to one representative embodiment.

FIG. 11 depicts stimulation system 1150 that generates electrical pulses for application to tissue of a patient according to one embodiment. In one embodiment, system 1150 is adapted to generate electrical pulses and deliver the pulses to tissue of the patient. For example, system 1150 may be adapted to stimulate spinal cord tissue, peripheral nerve tissue, deep brain tissue, cortical tissue, cardiac tissue, digestive tissue, pelvic floor tissue, or any other suitable tissue within a patient's body.

System 1150 includes implantable pulse generator 1100 that is adapted to generate electrical pulses for application to tissue of a patient. Implantable pulse generator 1100 typically comprises a metallic housing that encloses pulse generating circuitry 1102, controller 1101, charging coil (not shown), battery 1103, far-field and/or near field communication circuitry (not shown), battery charging circuitry 1104, etc. of the device. Although an implantable pulse generator is shown for the embodiment of FIG. 11, an external pulse generator (e.g., a "trial" stimulator) may alternatively be employed. The controller 1101 typically includes a microcontroller or other suitable processor for controlling the various other components of the device. Software code is typically stored in memory of the pulse generator 1100 for execution by the microcontroller or processor to control the various components of the device.

A processor and associated charge control circuitry for an implantable pulse generator is described in U.S. Patent Publication No. 20060259098, entitled "SYSTEMS AND METHODS FOR USE IN PULSE GENERATION," which is incorporated herein by reference. Circuitry for recharging a rechargeable battery of an implantable pulse generator using inductive coupling and external charging circuits are described in U.S. patent Ser. No. 11/109,114, entitled "IMPLANTABLE DEVICE AND SYSTEM FOR WIRELESS COMMUNICATION," which is incorporated herein by reference.

An example and discussion of "constant current" pulse generating circuitry is provided in U.S. Patent Publication No. 20060170486 entitled "PULSE GENERATOR HAVING AN EFFICIENT FRACTIONAL VOLTAGE CONVERTER AND METHOD OF USE," which is incorporated herein by reference. One or multiple sets of such circuitry may be provided within pulse generator 1100. Different pulses on different electrodes may be generated using a single set of pulse generating circuitry using consecutively generated pulses according to a "multi-stimset program" as is known in the art. Alternatively, multiple sets of such circuitry may be employed to provide pulse patterns that include simultaneously generated and delivered stimulation pulses through various electrodes of one or more stimulation leads as is also known in the art. Various sets of parameters may define the pulse characteristics and pulse timing for the pulses applied to various electrodes as is known in the art. Although constant current pulse generating circuitry is contemplated for some embodiments, any other suitable type of pulse generating circuitry may be employed such as constant voltage pulse generating circuitry.

Examples of commercially available implantable pulse generators and related devices include the EON™ MINI pulse generator, RAPID PROGRAMMER™ system, and patient controller devices available from St. Jude Medical Neuromodulation (Plano, Tex.), the PRECISION PLUS™ SCS System (including pulse generator, cordless charger, programmer with I-SCULPT™, and patient "Remote Control") available from Boston Scientific Neuromodulation Corporation (Valencia, Calif.), and the RESTOREULTRA™ neurostimulator, N'VISION™ Clinician Programmer, MYSTIM™ Patient Programmer and available from Medtronic, Inc. (Minneapolis, Minn.).

Stimulation system 1150 further comprises one or more stimulation leads 1120. Stimulation lead 1120 comprises a lead body of insulative material about a plurality of conductors that extend from a proximal end of lead 1120 to its distal end. The conductors electrically couple a plurality of electrodes 1121 to a plurality of terminals (not shown) of lead 1120. The terminals are adapted to receive electrical pulses and the electrodes 1121 are adapted to apply stimulation pulses to tissue of the patient. Also, sensing of physiological signals may occur through electrodes 1121, the conductors, and the terminals. Additionally or alternatively, various sensors (not shown) may be located near the distal end of stimulation lead 1120 and electrically coupled to terminals through conductors within the lead body 1111. Stimulation lead 1120 may include any suitable number of electrodes 1121, terminals, and internal conductors. Any suitable lengths, electrode configurations and other lead characteristics may selected or varied depending upon the therapy to be provided to the patient.

Electrodes 1121 may be provided on a paddle structure or a cuff structure according to some embodiments. The paddle structure or cuff structure may be fabricated using the fabrication processes discussed herein.

Stimulation system 1150 optionally comprises extension lead 1110. Extension lead 1110 is adapted to connect between pulse generator 100 and stimulation lead 1120. That is, electrical pulses are generated by pulse generator 1100 and provided to extension lead 1110 via a plurality of terminals (not shown) on the proximal end of extension lead 1110. The electrical pulses are conducted through conductors within lead body 1111 to housing 1112. Housing 1112 includes a plurality of electrical connectors (e.g., "Bal-Seal" connectors) that are adapted to connect to the terminals of lead 1120. Thereby, the pulses originating from pulse generator 1100 and conducted through the conductors of lead body 1111 are provided to stimulation lead 1120. The pulses are then conducted through the conductors of lead 1120 and applied to tissue of a patient via electrodes 1121.

In practice, stimulation lead 1120 is implanted within a suitable location within a patient adjacent to tissue of a patient to treat the patient's particular disorder(s). The lead body extends away from the implant site and is, eventually, tunneled underneath the skin to a secondary location. Housing 1112 of extension lead 1110 is coupled to the terminals of lead 1120 at the secondary location and is implanted at that secondary location. Lead body 1111 of extension lead 1110 is tunneled to a third location for connection with pulse generator 1100 (which is implanted at the third location).

Controller device 1160 may be implemented to recharge battery 1103 of pulse generator 1100 (although a separate recharging device could alternatively be employed). A "wand" 1165 may be electrically connected to controller device through suitable electrical connectors (not shown). The electrical connectors are electrically connected to coil 1166 (the "primary" coil) at the distal end of wand 1165 through respective wires (not shown). Typically, coil 1166 is connected to the wires through capacitors (not shown). Also, in some embodiments, wand 1165 may comprise one or more temperature sensors for use during charging operations.

The patient then places the primary coil 1166 against the patient's body immediately above the secondary coil (not shown), i.e., the coil of the implantable medical device. Preferably, the primary coil 1166 and the secondary coil are aligned in a coaxial manner by the patient for efficiency of the coupling between the primary and secondary coils. Controller 1160 generates an AC-signal to drive current through coil 1166 of wand 1165. Assuming that primary coil 1166 and secondary coil are suitably positioned relative to each other, the secondary coil is disposed within the field generated by the current driven through primary coil 1166. Current is then induced in secondary coil. The current induced in the coil of the implantable pulse generator is rectified and regulated to recharge battery 1103 by charging circuitry 1104. Charging circuitry 1104 may also communicate status messages to controller 1160 during charging operations using pulse-loading or any other suitable technique. For example, controller 1160 may communicate the coupling status, charging status, charge completion status, etc.

External controller device 1160 is also a device that permits the operations of pulse generator 1100 to be controlled by user after pulse generator 1100 is implanted within a patient, although in alternative embodiments separate devices are employed for charging and programming. Also, multiple controller devices may be provided for different types of users (e.g., the patient or a clinician). Controller device 1160 can be implemented by utilizing a suitable handheld processor-based system that possesses wireless communication capabilities. Software is typically stored in memory of controller device 1160 to control the various operations of controller device 1160. Also, the wireless communication functionality of controller device 1160 can be integrated within the handheld device package or provided as a separate attachable device. The interface functionality of controller device 1160 is implemented using suitable software code for interacting with the user and using the wireless communication capabilities to conduct communications with IPG 1100.

Controller device 1160 preferably provides one or more user interfaces to allow the user to operate pulse generator 1100 according to one or more stimulation programs to treat the patient's disorder(s). Each stimulation program may include one or more sets of stimulation parameters including pulse amplitude, pulse width, pulse frequency or inter-pulse period, pulse repetition parameter (e.g., number of times for a given pulse to be repeated for respective stimset during execution of program), etc. IPG 1100 modifies its internal parameters in response to the control signals from controller device 1160 to vary the stimulation characteristics of stimulation pulses transmitted through stimulation lead 1120 to the tissue of the patient. Neurostimulation systems, stimsets, and multi-stimset programs are discussed in PCT Publication No. WO 01/93953, entitled "NEUROMODULATION THERAPY SYSTEM," and U.S. Pat. No. 7,228,179, entitled "METHOD AND APPARATUS FOR PROVIDING COMPLEX TISSUE STIMULATION PATTERNS," which are incorporated herein by reference.

Although certain representative embodiments and advantages have been described in detail, it should be understood that various changes, substitutions and alterations can be made herein without departing from the spirit and scope of the appended claims. Moreover, the scope of the present application is not intended to be limited to the particular embodiments of the process, machine, manufacture, composition of matter, means, methods and steps described in the specification. As one of ordinary skill in the art will readily appreciate when reading the present application, other processes, machines, manufacture, compositions of matter, means, methods, or steps, presently existing or later to be developed that perform substantially the same function or achieve substantially the same result as the described embodiments may be utilized. Accordingly, the appended claims are intended to include within their scope such processes, machines, manufacture, compositions of matter, means, methods, or steps.

The invention claimed is:

1. A method of fabricating stimulation leads, the method comprising:
   providing a spool of polymer film;
   providing a plurality of payout carriers of wire;
   drawing the polymer film from the spool and the wires from the plurality of payout carriers over a rotating drum, wherein the drum comprises a plurality of grooves over an outer circumferential surface of the drum for directing the wires from the plurality of payout carriers, wherein a distance of each groove from an edge of the drum is varied about the circumference of the drum;
   bonding the wires to the polymer film while performing the drawing to form an intermediate assembly comprising the polymer film as a carrier with the bonded wires in a repeating pattern along a length of the intermediate assembly;

forming respective segments from the intermediate assembly;

forming respective stimulation portions from the respective segments, the stimulation portions comprising electrodes electrically coupled to the wires of the segments of the intermediate assembly; and forming stimulation leads including the stimulation portions with the wires of the segments electrically coupled to wires of respective lead bodies.

2. The method of claim 1 wherein the repeating pattern includes a first portion adapted for coupling the wires of the polymer film to the wires of a lead body and includes a second portion adapted for coupling to electrodes.

3. The method of claim 1 wherein the bonding comprises: applying ultrasonic energy to heat the polymer film.

4. The method of claim 1 wherein the bonding comprises: applying laser energy to heat the polymer film.

5. The method of claim 1 wherein the bonding comprises: applying heat to the polymer film through a heated roller that applies pressure to press the polymer film against the wires.

6. The method of claim 1 wherein the forming the stimulation portions comprises:
creating a respective paddle structure for each stimulation portion.

7. The method of claim 6 wherein the creating comprises: molding a respective paddle structure about each segment.

8. The method of claim 7 wherein the electrodes are attached to the wires of each segment before the molding is performed.

9. The method of claim 7 wherein the molding creates recess in the paddle structure for subsequent placement of electrodes.

10. The method of 1 wherein the stimulation portions provide a cuff structure adapted for stimulation of a peripheral nerve.

11. The method of claim 1 wherein the respective segments are biased to return to a curved-profile when placed in a relaxed state.

12. The method of claim 1 further comprising:
forming the polymer film by extruding polymer material about a working material and splitting the extruded polymer material to separate the extruded polymer material from the working material.

13. The method of claim 1 wherein the forming stimulation leads comprises:
laser welding wires of the respective segments to wires of corresponding lead bodies.

14. The method of claim 1 wherein the repeating pattern comprises two sets of wires on each side of the respective segments.

15. The method of claim 1 wherein the repeating pattern comprises:
a first section with the wires sloped relative to an edge of the polymer film of the intermediate assembly; and
a second section with the wires generally parallel to an edge of the polymer film of the intermediate assembly.

* * * * *